United States Patent
Chen et al.

(10) Patent No.: US 9,243,178 B2
(45) Date of Patent: Jan. 26, 2016

(54) POLYAMIDE COMPOUNDS CONTAINING PITCH CARBON FIBER

(75) Inventors: Haiyan Chen, Shanghai (CN); Ching Lee Joseph Lim, Avon Lake, OH (US); Lai Chang Fong, Avon Lake, OH (US)

(73) Assignee: PolyOne Corporation, Avon Lake, OH (US)

( * ) Notice: Subject to any disclaimer, the term of this patent is extended or adjusted under 35 U.S.C. 154(b) by 186 days.

(21) Appl. No.: 14/232,864

(22) PCT Filed: Jul. 12, 2012

(86) PCT No.: PCT/US2012/046509
§ 371 (c)(1),
(2), (4) Date: Jan. 14, 2014

(87) PCT Pub. No.: WO2013/012685
PCT Pub. Date: Jan. 24, 2013

(65) Prior Publication Data
US 2014/0166925 A1 Jun. 19, 2014

Related U.S. Application Data

(60) Provisional application No. 61/508,118, filed on Jul. 15, 2011.

(51) Int. Cl.
| | | |
|---|---|---|
| *C09K 5/14* | (2006.01) | |
| *C08K 3/38* | (2006.01) | |
| *C08K 5/5313* | (2006.01) | |
| *C08K 7/06* | (2006.01) | |

(52) U.S. Cl.
CPC ... *C09K 5/14* (2013.01); *C08K 3/38* (2013.01); *C08K 5/5313* (2013.01); *C08K 7/06* (2013.01)

(58) Field of Classification Search
CPC ........................................................ C09K 5/14
USPC ................................................. 252/78.5, 75
See application file for complete search history.

(56) References Cited

U.S. PATENT DOCUMENTS

| | | | |
|---|---|---|---|
| 7,939,588 B2 | 5/2011 | Hong et al. | |
| 9,090,751 B2 * | 7/2015 | Saga | C08K 3/0008 1/1 |
| 2006/0111548 A1 * | 5/2006 | Elkovitch | C08L 71/12 528/205 |
| 2007/0155872 A1 * | 7/2007 | Hong | C07F 9/3205 524/115 |
| 2008/0153959 A1 | 6/2008 | Charati et al. | |
| 2009/0004393 A1 * | 1/2009 | Rodgers | B32B 5/26 427/385.5 |
| 2009/0061193 A1 * | 3/2009 | Hara | C08J 5/042 428/220 |
| 2010/0020559 A1 | 1/2010 | Janssen et al. | |
| 2013/0207029 A1 | 8/2013 | Janssen et al. | |

FOREIGN PATENT DOCUMENTS

| | | |
|---|---|---|
| JP | 2010024343 | 2/2010 |
| JP | 2010024343 A * | 2/2010 |

* cited by examiner

*Primary Examiner* — Douglas McGinty
(74) *Attorney, Agent, or Firm* — John H. Hornickel; Maria M. Hoke

(57) ABSTRACT

A thermally conductive polyamide compound is disclosed. The compound comprises a polyamide matrix with pitch-based carbon fiber, boron nitride, and organophosphinate flame regardant dispersed in the matrix. The compound can be extruded or molded into a heat dissipating article.

12 Claims, No Drawings

POLYAMIDE COMPOUNDS CONTAINING PITCH CARBON FIBER

CLAIM OF PRIORITY

This application claims priority from U.S. Provisional Patent Application Ser. No. 61/508,118 and filed on Jul. 15, 2011, which is incorporated by reference.

FIELD OF THE INVENTION

This invention concerns thermoplastic polymer compounds which are thermally conductive and flame retardant.

BACKGROUND OF THE INVENTION

Any energized product in modern society is not ideally efficient. Therefore, the consumption of energy is accompanied by the emission of heat. Dissipation of heat from an energized product is a common industrial engineering consideration. Electronic products are particularly susceptible to excessive heat. Personal computers contain fans for keeping sensitive electronic parts at or near the ambient temperature by dissipating the heat by convection.

Thermally conductive polymer compounds also exist to dissipate heat by conduction. These compounds are formed into parts to serve as heat sinks, radiators, etc. and other items more traditionally made of metal. Often aluminum oxide, or more commonly called alumina, is used as an additive to a thermoplastic polymer matrix to serve as the vehicle for dissipation of heat. But alumina is a particularly abrasive material which can degrade the internal surfaces of manufacturing equipment such as compounding extruders.

U.S. Pat. No. 7,902,283 (Barber et al.) discloses thermally conductive polyamide compounds using zinc sulfide.

SUMMARY OF THE INVENTION

What the art needs is a thermally conductive polyamide compound which has thermal conductivity, electrical surface resistivity, and flame retardancy.

The present invention has solved that problem by using the following functional additives with the polyamide resin: the combination of boron nitride and pitch-based carbon fiber as thermal filler, and a non-halogenated organic phosphinate as a flame retardant.

Thus, one aspect of the invention is a thermally conductive polymer compound, comprising polyamide, pitch-based carbon fiber, boron nitride, and a non-halogenated organic phosphinate, wherein the compound has an in-plane thermal conductivity of more than 8 W/mK as measured using ASTM E1461.

Features of the invention will be explored below.

EMBODIMENTS OF THE INVENTION

Polyamide

Any polyamide is a candidate for use in the compound, whether obtained from petrochemical or bio-derived sources.

The most popular polyamide is polyamide 6 (also known as nylon 6). As the examples show below, polyamide 6 resin can be made thermally conductive to an extent greater than 8 W/mK as measured using ASTM E1461.

Non-limiting examples of other polyamides (PA) which are candidates to serve as the matrix for the compound of the present invention Suitable polyamide include both amorphous and semi-crystalline polyamides, aliphatic and aromatic polyamides. Examples of aliphatic polyamides, in addition to PA 6, include; PA 11; PA12; PA 4,6; PA 6,6; PA 10,10; PA 12,12; copolyamides; and combinations thereof. Examples of aromatic polyamides include PA 6I; PA 6T; PA 9T; PA10T; PA 6I/66; PA 6T/66; PA 6I/6T; copolyamides; and combinations thereof. Without undue experimentation, one of ordinary skill in the art can select a polyamide matrix based on considerations of cost, manufacturing technique, physical properties, chemical properties, etc.

Boron Nitride

One thermally conductive filler potentially useful for the compound is boron nitride, available commercially as cubic boron nitride or as hexagonal boron nitride. As is known in the art, hexagonal boron nitride provides a higher thermal conductivity than cubic boron nitride and therefore is preferred. Also hexagonal boron nitride assists in resulting high surface resistivity.

Pitch-Based Carbon Fiber

Pitch-based carbon fiber is used in this invention. As the examples show below, pitch-based carbon fiber is superior to graphite, either synthetic or expanded in form.

Pitch-based carbon fiber is also preferred over carbon fiber derived from polyacrylonitrile (PAN) because the uses of the compound of the invention require electrical resistivity, not electrical conductivity. Pitch-based carbon fiber is known for its electrical resistivity.

Flame Retardant

Polymer compounds benefit from inclusion of flame retardant functional additives. It is now preferable in the industry to use non-halogenated flame retardants. Any non-halogen flame retardant is a candidate for use in the compound, but as the examples show below, the selection of an organophosphinate as a flame retardant does not detract from the performance properties of the compound, especially surface resistivity and thermal conductivity.

Optional Other Additives

The compound of the present invention can include conventional plastics additives in an amount that is sufficient to obtain a desired processing or performance property for the compound. The amount should not be wasteful of the additive or detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders, such as glass fiber; smoke suppresants; impact modifiers; initiators; lubricants; micas; pigments, colorants and dyes; plasticizers, such as core/shell impact modifiers; processing aids; release agents; silanes, titanates and zirconates; slip and anti-blocking agents; stabilizers; stearates; ultraviolet light absorbers; viscosity regulators; waxes; catalyst deactivators, and combinations of them.

Ingredients

Table 1 shows the acceptable, desirable, and preferred amounts of each of the ingredients discussed above, recognizing that the optional ingredients need not be present at all. The compound can comprise the ingredients, consist essentially of the ingredients, or consist of the ingredients. All amounts are expressed in weight percent of the total compound.

TABLE 1

Range of Ingredients (Weight Percent)

|  | Acceptable | Desirable | Preferable |
|---|---|---|---|
| Polyamide Matrix | 20-45 | 25-40 | 27-37 |
| Boron Nitride | 15-45 | 20-40 | 25-35 |
| Pitch-based Carbon Fiber | 10-30 | 15-25 | 18-22 |
| Non-halogenated Flame Retardant | 10-35 | 15-25 | 15-20 |
| Optional Other Additives | 0-20 | 0.2-15 | 0.2-10 |

Processing

The preparation of compounds of the present invention is uncomplicated. The compound of the present can be made in batch or continuous operations.

Mixing in a continuous process typically occurs in a single or twin screw extruder that is elevated to a temperature that is sufficient to melt the polymer matrix with addition of other ingredients either at the head of the extruder or downstream in the extruder. Extruder speeds can range from about 50 to about 500 revolutions per minute (rpm), and preferably from about 100 to about 300 rpm. Typically, the output from the extruder is pelletized for later extrusion or molding into polymeric articles.

Mixing in a batch process typically occurs in a Banbury mixer that is capable of operating at a temperature that is sufficient to melt the polymer matrix to permit addition of the solid ingredient additives. The mixing speeds range from 60 to 1000 rpm. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

USEFULNESS OF THE INVENTION

Compounds of the present invention can dissipate heat quite efficiently, making them suitable for extruded or molded articles designed to contact a heated object and conduct that heat away from that object or contact a heated object and conduct that heat toward a second object that needs heat also. Either way, the compounds of the present invention can transport heat away from that source, whether to distribute to a remote location from that object (a radiator in a residential room) or to dissipate to a remote location from that object (a heat sink).

One industry which needs management and dissipation of heat is the lighting industry, especially lighting produced by light emitting diodes (LEDs) as opposed to filamented electrical lamps. LEDs are sensitive in performance in the presence of temperature, as are the electronics nearby or contiguous to a lighted LED. Therefore, a preferred molded article is a LED housing.

The physical properties of the polymer matrix determine the suitability of the compound for specific polymer engineering purposes; the use of the combination of boron nitride and pitch-based carbon fiber imparts thermally conductivity where none or only a little thermal conductivity previously existed in the polymer matrix.

Examples provide data for evaluation.

EXAMPLES

Table 2 shows the ingredients chosen for Examples 1 and 2 and Comparative Examples A and B.

TABLE 2

| Ingredient Name | A | B | 1 | 2 |
|---|---|---|---|---|
| Polyamide 6 (Ultramid B3S Natural from BASF) | 27.6 | 37.6 | 37.6 | 27.6 |
| Hexagonal boron nitride (HBN-Premium Grade from Industrial Supply, Inc., USA) | 35 | 25 | 25 | 35 |
| Pitch-based carbon fiber (Thermalgraph DKD from Cytec, USA) |  |  | 20 | 20 |
| Synthetic graphite (Thermcarb TC300 from Asbury Graphite Mills, Inc. USA) | 20 |  |  |  |
| Expanded graphite (C-THERM 001 from Timcal, Switzerland) |  | 20 |  |  |
| Exolit OP1312 non-halogenated flame retardant based on organic phosphinates (Clariant) | 17 | 17 | 17 | 17 |
| Trisarylphosphite processing stabilizer (Irgafos 168 from BASF) | 0.2 | 0.2 | 0.2 | 0.2 |
| Phenolic antioxidant (TP-H-7005 from Brueggeman, Germany) | 0.2 | 0.2 | 0.2 | 0.2 |
| Total | 100 | 100 | 100 | 100 |

Table 3 shows the mixing conditions in a ZSK 26 mm twin screw extruder.

TABLE 3

Extruder Conditions

| Order of Addition of Ingredients | At throat except Side feed for thermal filler and flame retardant additive |
|---|---|
| All Zones (° C.) | 265 |
| Die (° C.) | 265 |
| RPM | 280 |

The extrudate was pelletized for later molding.

Using a JSW molding machine, the following settings were used to mold plaques and tensile test bars of the compound of the present invention.

TABLE 4

Molding Conditions

| Drying Conditions: | |
|---|---|
| Temperature | 80~90° C. |
| Time (h) | 2~4 h |
| Temperatures: | |
| Nozzle (° C.) | 265 |
| Zone 1 (° C.) | 265 |
| Zone 2 (° C.) | 275 |
| Zone 3 (° C.) | 275 |
| Mold (° C.) | 65~85 |
| Oil Temp (° C.) | 40 |

TABLE 4-continued

Molding Conditions

Speeds:

| | |
|---|---|
| Screw RPM | 30–40% |
| % Shot - Inj Vel Stg 1 | 30% |
| % Shot - Inj Vel Stg 2 | 30% |
| % Shot - Inj Vel Stg 3 | 30% |
| % Shot - Inj Vel Stg 4 | 30% |
| % Shot - Inj Vel Stg 5 | 30% |

Pressures:

| | |
|---|---|
| Hold Stg 1 - Pressure (MPa)/Time(sec) | 50/10 |
| Hold Stg 2 - Pressure (MPa)/Time(sec) | 50/10 |

Timers:

| | |
|---|---|
| Injection Hold (sec) | 5 |
| Cooling Time (sec) | 20 |

Operation Settings:

| | |
|---|---|
| Shot Size | 64 mm |
| Cushion | 4 |

Table 5 shows the physical properties tested of the highest and lowest values of five samples of each Example and Comparative Example.

TABLE 5

Highest and Lowest Values Reported of Five Samples

| Property | A | B | 1 | 2 |
|---|---|---|---|---|
| Tensile Strength (ASTM D638) psi | 7916 | 5475 | 10,944 | 11,801 |
| Tensile Strength (ASTM D638) psi | 7881 | 5195 | 10,826 | 11,751 |
| Surface Resistivity (ASTM D257) | $3.60 \times 10^{12}$ | $4.80 \times 10^{12}$ | $4.00 \times 10^{12}$ | $3.20 \times 10^{12}$ |
| Surface Resistivity (ASTM D257) | $2.00 \times 10^{12}$ | $1.00 \times 10^{6}$ | $1.20 \times 10^{12}$ | $1.10 \times 10^{12}$ |
| Thermal Conductivity In-plane (ASTM E1461) W/mK | 6.53 | 6.85 | 8.12 | 12.87 |
| Thermal Conductivity In-plane (ASTM E1461) | 6.54 | 6.91 | 8.11 | 12.56 |
| Melt Flow Rate at 275° C. and 5 kg (ASTM D1238) | No flow | No flow | 1.4 | No flow |
| Melt Flow Rate at 275° C. and 5 kg (ASTM D1238) | 10.6 | No flow | 16.6 | No flow |

For the Thermal Conductivity testing, the samples were spray coated with dgf123 graphite and tested in a Netzsch Nanoflash LFA 447 instrument, conforming to ASTM D1461-01. The experimental parameters used to collect the data were: Temperature: 25° C., Filter: 100, Pulse: medium, and Pre-amp and amp: 10×5002 tt. After measuring Heat Capacity and Diffusivity, the Thermal Conductivity was calculated according to the following equation:

$$K = \rho * Cp * \alpha$$

where: $\rho$ is density (g/cm$^3$); Cp is heat capacity (J/gC); and $\alpha$ is diffusivity (mm$^2$/s).

The thermal conductivity comparison between Comparative Examples A and B and Examples 1 and 2, respectively, demonstrates that, with all other variables constant, the in-plane thermal conductivity increased a minimum of 25% and places both Examples 1 and 2 above the threshold of 8 W/mK. Example 2, which is preferred over Example 1, has excellent in-plane thermal conductivity for a polyamide compound—greater than 12 W/mK, with a formulation in Example 2 which reverses the amount of the polyamide matrix and the boron nitride as compared with the formulation in Example 1.

Surface resistivity was also superior for Examples 1 and 2 as compared to Comparative Examples A and B.

Other physical properties seen in Table 5 showed that the formulations of Examples 1 and 2 are acceptable for use as a molded or extruded article for management of thermal conductivity.

The variance in the results of the two samples, the highest and lowest of five samples of each Example can be attributed to sample preparation, testing circumstances, etc.

The invention is not limited to the above embodiments. The claims follow.

What is claimed is:

1. A thermally conductive polymer compound, comprising:
   (a) polyamide,
   (b) pitch-based carbon fiber,
   (c) boron nitride, and
   (d) a non-halogenated organic phosphinate,
   wherein the compound has an in-plane thermal conductivity of more than 8 W/mK as measured using ASTM E1461.

2. The compound of claim 1, wherein the polyamide is polyamide 6.

3. The compound of claim 1, wherein the boron nitride is hexagonal boron nitride.

4. The compound of claim 1, further comprising an additive selected from the group consisting of adhesion promoters; biocides; anti-fogging agents; anti-static agents; bonding, blowing and foaming agents; dispersants; fillers and extenders; smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; catalyst deactivators, and combinations of them.

5. The compound of claim 1, wherein the compound has ingredients in amounts expressed in weight percent:

| | |
|---|---|
| Polyamide Matrix | 20-45 |
| Boron Nitride | 15-45 |
| Pitch-based Carbon Fiber | 10-30 |
| Non-halogenated Flame Retardant | 10-35 |
| Optional Other Additives. | 0-20 |

6. The compound of claim 1, wherein the compound has ingredients in amounts expressed in weight percent:

| | |
|---|---|
| Polyamide Matrix | 25-40 |
| Boron Nitride | 20-40 |
| Pitch-based Carbon Fiber | 15-25 |
| Non-halogenated Flame Retardant | 15-25 |
| Optional Other Additives. | 0.2-15 |

7. The compound of claim 1, wherein the compound has ingredients in amounts expressed in weight percent:

| | | |
|---|---|---|
| Polyamide Matrix | 27-37 | |
| Boron Nitride | 25-35 | |
| Pitch-based Carbon Fiber | 18-22 | |
| Non-halogenated Flame Retardant | 15-20 | |
| Optional Other Additives. | 0.2-10 | |

8. A molded article made from the compound of claim 1.

9. An extruded article made from the compound of claim 1.

10. A method of using the compound of claim 1, wherein the compound is extruded or molded into an article designed to contact a headed object and conduct that heat away from that object or contact a heated object and conduct that heat toward a second object that needs heat also.

11. The method of claim 10, wherein the polyamide of the compound is polyamide 6.

12. The method of claim 10, wherein the boron nitride of the compound is hexagonal boron nitride.

\* \* \* \* \*

UNITED STATES PATENT AND TRADEMARK OFFICE
CERTIFICATE OF CORRECTION

| | | |
|---|---|---|
| PATENT NO. | : 9,243,178 B2 | Page 1 of 1 |
| APPLICATION NO. | : 14/232864 | |
| DATED | : January 26, 2016 | |
| INVENTOR(S) | : Chen et al. | |

It is certified that error appears in the above-identified patent and that said Letters Patent is hereby corrected as shown below:

Claims

Column 7, line 17, Claim 1, "to contact a headed object" should be changed to -- to contact a heated object --

Signed and Sealed this
Twenty-sixth Day of April, 2016

Michelle K. Lee
*Director of the United States Patent and Trademark Office*